US008220225B1

(12) United States Patent
Zemlin

(10) Patent No.: US 8,220,225 B1

(45) Date of Patent: Jul. 17, 2012

(54) CAPPING CHUCK ASSEMBLY

(75) Inventor: Karl E. Zemlin, Carmel, IN (US)

(73) Assignee: Closure Systems International, Inc., Indianapolis, IN (US)

(*) Notice: Subject to any disclaimer, the term of this patent is extended or adjusted under 35 U.S.C. 154(b) by 0 days.

(21) Appl. No.: 13/369,437

(22) Filed: Feb. 9, 2012

Related U.S. Application Data

(60) Provisional application No. 61/448,749, filed on Mar. 3, 2011.

(51) Int. Cl.

| | |
|---|---|
| ***B67B 3/20*** | (2006.01) |
| ***B23B 31/16*** | (2006.01) |
| ***B23B 31/171*** | (2006.01) |

(52) U.S. Cl. ............................ 53/331.5; 279/17; 279/71

(58) Field of Classification Search .................... 53/317, 53/329, 331.5, 334–337, 344–346, 349, 351, 53/353, 367, 356; 279/17, 71; *B67B 3/20*
See application file for complete search history.

(56) References Cited

U.S. PATENT DOCUMENTS

| | | | | |
|---|---|---|---|---|
| 970,670 | A * | 9/1910 | Wahlstrom | 279/71 |
| 1,261,458 | A * | 4/1918 | Tate | 53/317 |
| 1,269,434 | A * | 6/1918 | Harling | 279/71 |
| 2,140,303 | A * | 12/1938 | Swanson | 279/71 |
| 3,585,787 | A * | 6/1971 | Podesta | 53/344 |
| 4,173,104 | A | 11/1979 | Koll | |
| 4,222,214 | A * | 9/1980 | Schultz et al. | 53/331.5 |
| 4,222,215 | A * | 9/1980 | Takano | 53/331.5 |
| 4,724,730 | A * | 2/1988 | Mader et al. | 81/53.2 |
| 4,856,386 | A * | 8/1989 | Rodriguez | 81/90.2 |
| 5,172,613 | A * | 12/1992 | Wesch, Jr. | 81/57.33 |
| 5,192,087 | A * | 3/1993 | Kawashima et al. | 279/71 |
| 5,251,515 | A * | 10/1993 | Merrick | 279/71 |
| 5,315,902 | A * | 5/1994 | Ragland et al. | 279/71 |
| 6,073,520 | A * | 6/2000 | Bueno et al. | 81/53.2 |
| 6,508,046 | B1 | 1/2003 | Resterhouse et al. | |
| 6,840,024 | B2 | 1/2005 | Ronchi | |
| 7,131,245 | B2 * | 11/2006 | Joerg et al. | 53/317 |
| 7,490,454 | B2 | 2/2009 | Brown | |
| 7,661,245 | B2 | 2/2010 | Brown | |
| 7,810,419 | B2 * | 10/2010 | Rundell et al. | 279/71 |
| 2006/0162286 | A1 * | 7/2006 | Spether | 53/331.5 |
| 2008/0223815 | A1 | 9/2008 | Konrad | |

* cited by examiner

*Primary Examiner* — Stephen F Gerrity

(74) *Attorney, Agent, or Firm* — Wood, Phillips, Katz, Clark & Mortimer

(57) ABSTRACT

A capping chuck assembly embodying the present invention comprises an outer chuck housing, and inner, central guide disc upon which a plurality of circumferentially spaced gripper segments are mounted. Each gripper segment includes an inner jaw portion for engagement with an associated closure, and an outer cam surface. The outer chuck housing defines a plurality of inwardly facing, cam drive surfaces positioned for respective engagement with the outer cam surfaces of the gripper segments, so that rotational drive of the outer chuck housing collectively drives the gripper segments and guide disc to urge the segments radially into engagement with an associated closure.

13 Claims, 4 Drawing Sheets

CAPPING CHUCK ASSEMBLY

TECHNICAL FIELD

The present invention relates generally to capping heads and chucks for rotatably applying closures to associated containers, and more particularly to an improved capping chuck assembly configured to automatically accommodate variations in a closure during application to an associated container, facilitating high-speed application while desirably avoiding misapplication of the closure.

BACKGROUND OF THE INVENTION

Threaded plastic closures formed from suitable polymeric materials have met with widespread acceptance in the market place for use on bottles and like containers, including those for carbonated and non-carbonated beverages. Efficient and versatile use of such closures is facilitated through the use of high-speed, automated capping equipment, which equipment is configured to rotatably apply each closure to an associated container so that an internal thread formation of the closure threadingly engages and mates with an external thread formation provided on the neck portion of the associated container.

In order to grip each closure as it is applied to an associated container, automated capping equipment of this type typically includes a plurality of rotatably driven capping chucks or heads. Each capping chuck is configured to releasable retain and grip a closure as the closure and an associated filled container are positioned for application of the closure. In a typical arrangement, the capping chuck is rotatably driven, together with the closure retained therein, relative to the associated container so that threaded application of the closure to that container is effected. Capping chucks of this nature are typically provided with a torque-limiting mechanism, whereby the closures are applied to the desired tightness on the associated container, and rotational drive of the capping chuck and closure discontinued. The capping chuck is thereafter disengaged from the closure, and the filled container and closure package is moved from the capping machine.

Versatile operation of this type of automated capping equipment is facilitated by configuring each capping chuck to accommodate application of differently sized closures. To this end, some capping chucks are provided with moveable, jaw-like elements which can "float" or shift to accommodate application of closures of different sizes. However, depending upon the specific configuration of such capping chucks, the closure may not necessarily be held in centered, coaxial relationship with the associated container. Eccentric contact between the bottom of the closure and the top of the associated container finish can undesirably result in improper positioning of the closure in the capping chuck, leading to an application defect such as a cocked or cross-threaded closure.

The present invention is directed to an improved capping chuck assembly which facilitates application of differently sized closures, having differing exterior features, while avoiding undesirable misapplication of the closures to associated containers.

SUMMARY OF THE INVENTION

A capping chuck assembly embodying the principles of the present invention is configured to facilitate high-speed application of closures to containers, while accommodating application of closures having differing dimensions and exterior configurations. This is achieved by providing the capping chuck assembly with a plurality of radially moveable gripper segments, which collectively act to grip an associated closure, and rotatably apply the closure to an associated container. Notably, the present capping chuck is configured to accommodate variations in dimensions and closure features, including exterior knurl patterns, while maintaining the closure in substantially centered relationship with an associated container, ensuring proper closure application, desirably avoiding misapplication such as cocking or cross-threading.

In accordance with the illustrated embodiment, the present capping chuck assembly includes an outer chuck housing, and an inner gripper assembly. The inner gripper assembly includes a central guide disc, and a plurality of circumferentially spaced gripper segments. The central guide disc includes a guide disc base and a guide disc cover secured to the guide disc base, with the gripper segments being mounted between the disc cover and disc base. The gripper segments are individually moveable radially of the central guide disc, with each gripper segment having an inner jaw portion for engagement with an associated closure, and an outer cam surface.

The outer chuck housing, within which the central guide disc and gripper segments are positioned, has an inwardly facing drive surface defining a plurality of circumferentially spaced cam drive surfaces positioned for respective engagement with the outer cam surfaces of the gripper segments. By this arrangement, rotational drive of the outer chuck assembly acts to drive the central guide disc and gripper segments, with the cam drive surfaces of the outer chuck housing respectively engaging the outer cam surfaces of the gripper segments.

Notably, the configuration of the central guide disc, including the guide disc base, allows the gripper segments to rotate as a unit, and ensures that the segments are collectively arranged in concentric relationship with the central axis of the capping chuck. In the preferred embodiment, a biasing element, such as in the form of one or more elastomeric O-rings, provides a light radial force which keeps all of the gripper segments in their inner-most position, and provides a limited amount of pressure between an inserted closure and the gripper segments when no torque is being applied to the closure.

The outer cam surface of each gripper segment is contacted by its respective cam drive surface of the outer chuck housing only when the closure resists rotation as it is applied to the associated container. The geometry of the gripper segments, relative to the cooperating cam surfaces, results in a radial load which increases the grip of the chuck on the closure as application torque increases. The line of action or vector of the radial force passes approximately through the contact point between the closure and each gripper segment. Notably, this more than counteracts any opposing radial force that is generated between the closure and the gripper segments, thereby desirably ensuring positive control of the closure at any torque level.

In accordance with the illustrated embodiment, the jaw portion of each gripper segment has one or more gripping teeth, with the jaw portion of each gripper segment having one or more regions which are devoid of gripping teeth. The gripping teeth of each of the gripper segments are generally aligned with the force vector that is created through that one of the segments by the respective one of the cam drive surfaces of the chuck housing acting against the cam surface of that one of the gripper segments. This arrangement has been found to desirably efficiently transmit the rotational application torque from the outer chuck housing to the closure during application, while at the same time readily accommodating differently sized closures, as well as closures having differing knurl patterns.

A torsion spring operatively connecting the central guide disc and the outer housing of the chuck ensures that the unloaded chuck has the maximum possible clearance between the gripper segments and the cam drive surfaces of the outer chuck housing. By this arrangement, a closure being inserted into the chuck encounters only the resistance provided by the O-ring biasing element on the gripper segments.

Other features and advantages of the present invention will become readily apparent from the following detailed description, the accompany drawings, the appended claims.

DETAILED DESCRIPTION

Figure 1:
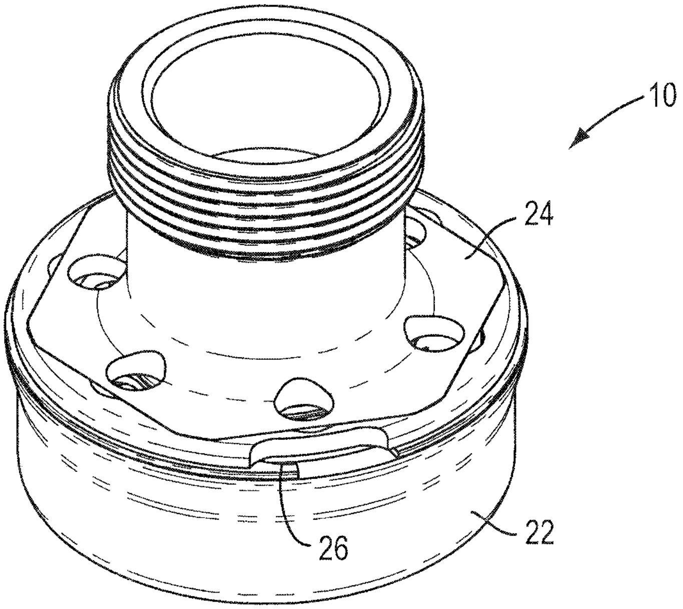
FIG. 1 is a top perspective view of a capping chuck assembly embodying the principles of the present invention.
Figure 2:
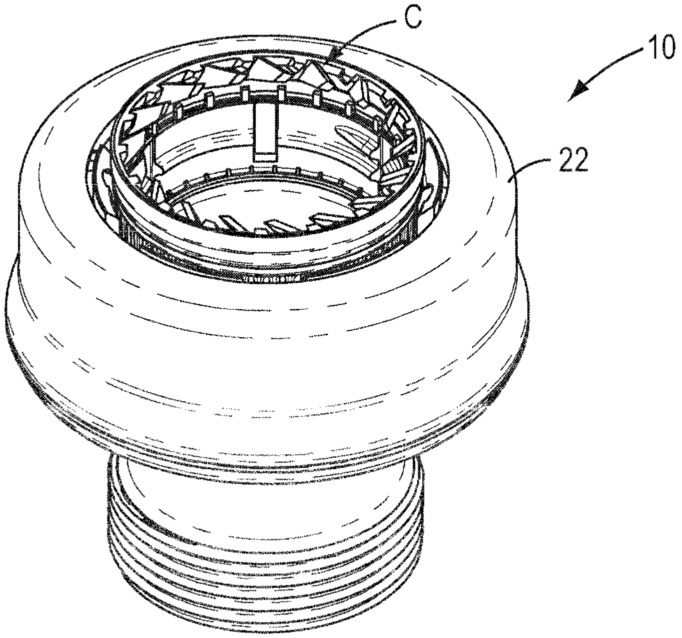
FIG. 2 is a bottom perspective view of the present capping chuck assembly.
Figure 3:
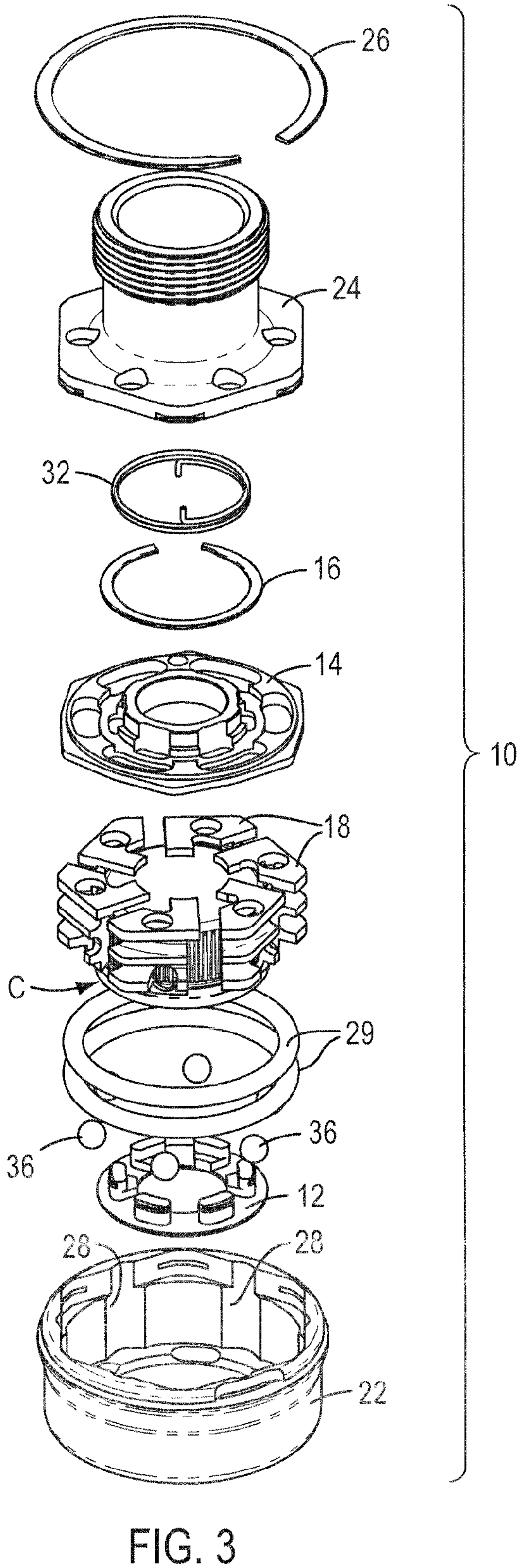
FIG. 3 is a vertical exploded perspective view of the present capping chuck assembly.
Figure 4:
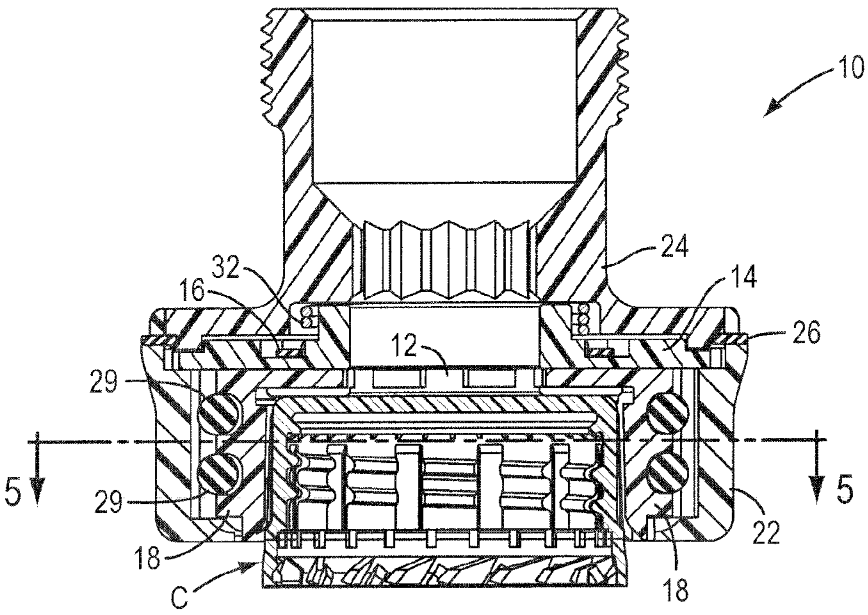
FIG. 4 is a cross-sectional view of the present capping chuck assembly.

While the present invention is susceptible of embodiment in various forms, there is shown in the drawings and will hereinafter be described a presently preferred embodiment, with the understanding that the present disclosure is to be considered as an exemplification of the invention, and is not intended to limit the invention to this specific embodiment illustrated.

With reference now to the drawings, therein is illustrated a capping chuck assembly 10 embodying the principals of the present invention. As will be recognized by those familiar with the art, capping chuck assembly 10 is configured for use with high-speed, automatic capping equipment which facilitates threaded application of closures to associated containers, such as in a bottling plant or like filling operation. To this end, the capping chuck assembly is mounted in an associated rotary drive mechanism (not shown), whereby the capping chuck assembly is rotatably driven, to thereby rotatably apply a closure to an associated container.

Notably, the present capping chuck assembly has been specifically configured to accommodate variations in dimensions of the closures which are being applied, and can further accommodate variations in the profiles or exterior features of such closures, such as knurl patterns. This desirably provides distinct advantages over traditional "one-piece" capping chucks, which require very consistent closure diameters. Minor dimensional changes in closures, such as due to colorants, can undesirably affect the fit of closures in such a chuck, and even similar profiles from different closure suppliers may require the use of unique one-piece chucks.

The present capping chuck assembly provides distinct advantages over so-called "floating" capping chucks, which can undesirably limit the specific knurl profiles or other exterior closure features. Additionally, outward radial force generated between the gripping segments of such a floating chuck, and the knurl features of an associated closure, can undesirably reduce the radial pressure as torque between the segments and the closure is increased.

Additionally, the lack of centering of the segments in such a chuck assembly precludes any control of the alignment between the closure and the finish of the container when the closure is being applied. Eccentric contact between the bottom of a closure and the top of a container finish can undesirably upset the position of the closure in the capping chuck, and lead to an application defect such as a cocked or cross-threaded closure. Because there is no mechanism in this type of capping chuck to establish a resting position of the chuck segments within the outer cam of the device, in some instances the relative orientation of the segments to the outer cam can prevent their radial movement as the closure is inserted into the chuck.

The present capping chuck assembly significantly improves upon these specific shortcomings in so-called floating capping chuck arrangements. In accordance with the illustrated embodiment, the present capping chuck assembly 10 (shown with an associated closure C) includes an outer chuck assembly, and an inner gripper assembly positioned within the outer chuck assembly. In particular, the gripper assembly includes a central guide disc including a guide disc base 12, and a guide disc cover 14 secured to the guide disc base 12 by a retaining ring 16. The guide disc base defines a plurality of circumferentially spaced guide channels within which a plurality of circumferentially spaced gripper segments 18 are respectively positioned for movement radially of the central guide disc. Each of the gripper segments 18 includes an inner jaw portion for engagement with an associated closure, and an outer cam surface 19 which cooperates with the outer chuck housing for rotatably applying the closure to an associated container. While six (6) of the gripper segments 18 are shown in the illustrated embodiment, the specific number of gripper segments can be varied while keeping with the principles disclosed herein.

In accordance with the illustrated embodiment, the outer chuck housing of the chuck assembly 10 includes a lower housing 22, and an upper housing 24 secured to the lower housing 22 by a retaining ring 26. In order to rotatably drive the inner central guide disc and gripper segments 18 carried thereby as a unit, the lower chuck housing has an inwardly facing drive surface defining a plurality of circumferentially spaced cam drive surfaces 28 positioned for respective engagement with the outer cam surfaces 19 of the gripper segments 18. By this arrangement, by rotational drive of the outer chuck housing, the cam drive surfaces 28 collectively drive the outer cam surfaces 19 of the gripper segments 18, to thereby drive the central guide disc and the gripper segments together with the outer chuck assembly, and to urge and radially drive the segments 18 into engagement with the associated closure.

In the preferred form, at least one biasing element collectively urges the gripper segments 18 inwardly of the central guide disc into engagement with the associated closure. In the illustrated embodiment, this is provided by a pair of ring-shaped biasing element which extend circumferentially about the gripper segments 18 for urging the gripper segments inwardly of the guide disc. In the illustrated form, the biasing elements are provided in the form of an elastomeric O-rings 29.

In the preferred embodiment, a torsion spring 32 operatively connects the central guide disc and the outer chuck housing 24. In the illustrated embodiment, the torsion spring 32 is operatively connected to the guide disc cover 14 and the upper chuck housing 24, and acts in opposition to the rotational drive of the outer chuck housing against the outer cam surfaces 19 of the gripper elements 18. The provision of the torsion spring 34 desirably acts to ensure that the unloaded chuck has the maximum possible clearance between the gripper segments and the cam drive surfaces of the outer chuck housing, so that a closure being inserted into the chuck encounters only the resistance provided by the O-ring biasing element 29 on the gripper segments.

Because the gripper segments are radially guided precisely in the guide disc, only limited contact between each segment and the associated cam drive surfaces is required. This desirably enhances the range of knurl geometries and closure geometries that can be handled by a single capping chuck assembly.

Figure 5:
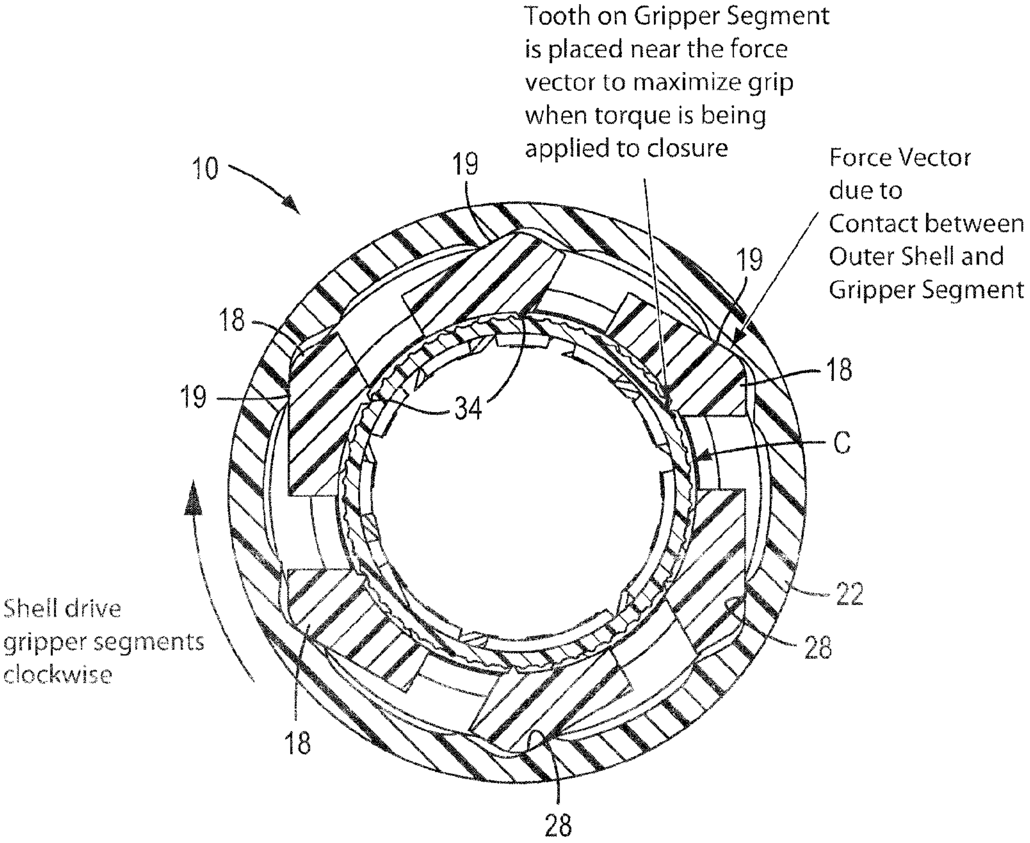
FIG. 5 is a cross-sectional view taken along line 5-5 of FIG. 4.

In the preferred embodiment, the jaw portion of each of the gripper segments has one or more gripping teeth 34 (see FIG. 5) with the jaw portion of each of the gripper segments having one or more regions which are devoid of gripping teeth. As shown in FIG. 5, the gripping teeth of each of the gripper segments are generally aligned with a force vector that is created through that one of the gripper segments by the respective one of the cam drive surfaces 28 of the lower chuck housing 22 acting against the cam surface 19 of that one of the gripper segments 18. In the illustrated embodiment, the jaw portion of each of the gripper segments 18 includes a single gripping tooth 34.

By way of example, a present embodiment of the present invention can hold and apply closures with different knurl counts and outside diameters which vary as much as 2.5 mm (0.10 inches).

Figure 6:
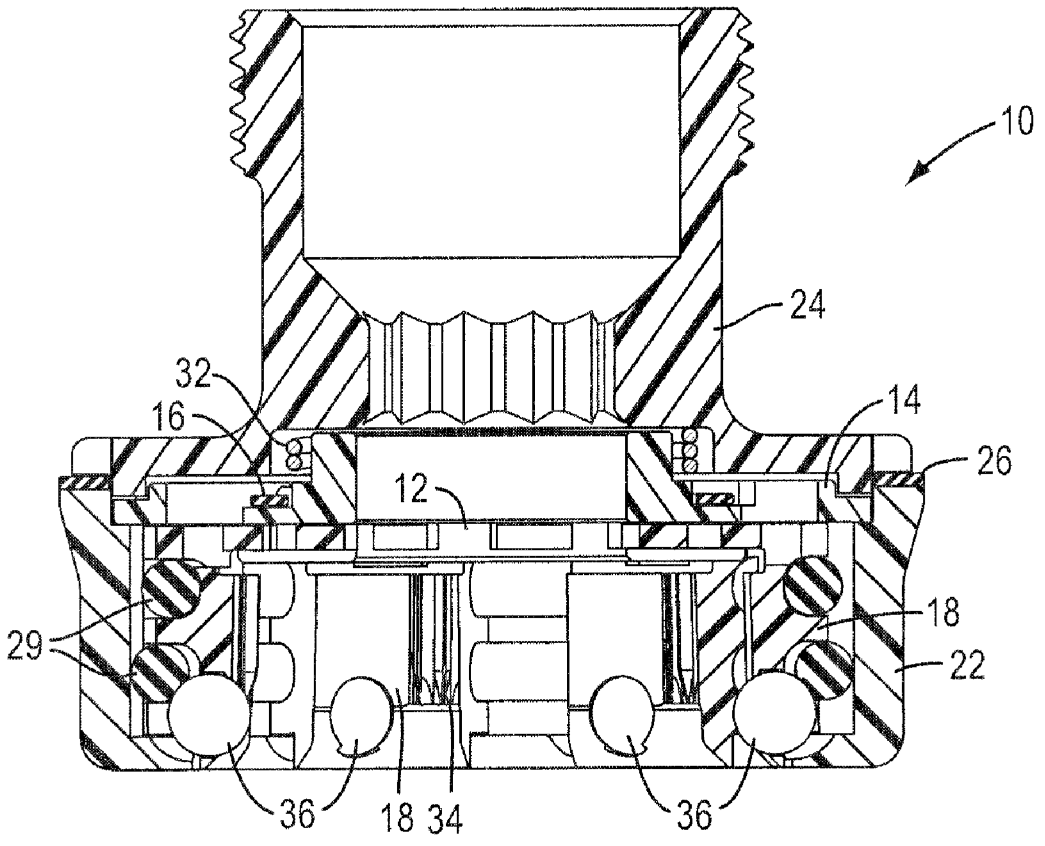
FIG. 6 is a further cross-sectional view of the present capping chuck assembly.

In the preferred embodiment of the present capping chuck assembly, each of the gripper segments 18 is provided with a ball bearing 36 which fits within the respective gripper segment, and projects slightly inwardly of the inner jaw portion of the segment. The lower one of the elastomeric O-rings 29 surrounds the ball bearings 36, and urges them generally inwardly (see FIG. 6). The ball bearings 36 desirably act to pre-orient closures having certain knurl patterns, including, for example, 24 relatively wide knurls. Additionally, by virtue of the typical bulge formed in the side wall of a closure at the closure thread formation, the inwardly biased ball bearings 36 act to releasably retain the closure within the chuck assembly.

Thus, the present capping chuck assembly is configured such that the gripper segments 18 and central guide disc rotate as a unit, ensuring that the segments collectively remain concentric with the central axis of the chuck assembly. The biasing element, such as in the form of elastomeric O-rings 29, desirably provides a light radial force which keeps all of the gripper segments 18 in their innermost position, and provides some pressure between an inserted closure and the gripper segments when no torque is being applied to the closure.

The outer cam surface 19 of each gripper segment 18 contacts the inwardly facing cam drive surfaces 28 of the outer chuck housing only when the closure resists rotation as it is applied to the associated container. The geometry of the chuck gripper segments, relative to the cooperative cam surfaces, results in a radial load which increases the grip of the chuck on the closure as rotational drive torque increases. The line of action or force vector of the radial force passes approximately through the contact point between the closure of the gripper segments. This more than counteracts any opposing radial force that is generated between the closure and the gripper segments, desirably ensuring positive control of the closure at any torque level.

From the foregoing, we observe that numerous modifications and variations can be effected without departing from the true spirit and scope of the novel concept of the present invention. It is to be understood that no limitation with respect to the specific embodiment illustrated herein is intended or should be inferred. The disclosure is intended to cover, by the appended claims, all such modifications as fall within the scope of the claims.

What is claimed is:

1. A capping chuck assembly, comprising:

a central guide disc;

a plurality of circumferentially spaced gripper segments mounted on said central guide disc for rotation therewith, said gripper segments being individually movable generally radially of said central guide disc, and each having an inner jaw portion for engagement with an associated closure, and an outer cam surface; and an outer chuck housing within which said central guide disc and said plurality of gripper segments are positioned, said chuck housing having an inwardly facing surface defining a plurality of circumferentially spaced cam drive surfaces positioned for respective engagement with the outer cam surfaces of said gripper segments, so that attendant to rotational drive of said outer chuck housing, said cam drive surfaces collectively drive the outer cam surfaces of said gripper segments to drive said central guide disc and said gripper segments together with said outer chuck housing and to urge said segments into engagement with the associated closure, including a biasing element for collectively urging said gripper segments inwardly of said central guide disc into engagement with the associated closure.

2. A capping chuck assembly in accordance with claim 1, wherein said biasing element extends circumferentially about said gripper segments for urging said gripper segments inwardly of said central guide disc.

3. A capping chuck assembly in accordance with claim 2, wherein said biasing element comprising an elastomeric O-ring.

4. A capping chuck assembly in accordance with claim 1, including a torsion spring operatively connecting said central guide disc and said outer chuck housing, said torsion spring acting in opposition to the rotational drive of said outer chuck housing against the outer cam surfaces of said gripper segments.

5. A capping chuck assembly, comprising:

a central guide disc, including a guide disc base and a guide disc cover secured to said guide disc base;

a plurality of circumferentially spaced gripper segments mounted on said central guide disc between said guide disc cover and said guide disc base for rotation with said guide disc, said gripper segments being individually movable generally radially of said central guide disc, and each having an inner jaw portion for engagement with an associated closure, and an outer cam surface;

a ring-shaped biasing element extending circumferentially about said gripper segments for urging said gripper segments inwardly of said central guide disc; and an outer chuck housing within which said central guide disc and said plurality of gripper segments are positioned, said chuck housing having an inwardly facing surface defining a plurality of circumferentially spaced cam drive surfaces positioned for respective engagement with the outer cam surfaces of said gripper segments, so that attendant to engagement with the outer cam surfaces of said gripper segments, so that attendant to rotational drive of said outer chuck housing, said cam drive surfaces collectively drive the outer cam surfaces of said gripper segments to drive said central guide disc and said gripper segments together with said outer chuck housing, and to urge said segments into engagement with the associated closure.

6. A capping chuck assembly in accordance with claim 5, including a torsion spring operatively connecting said central guide disc and said outer chuck housing, said torsion spring acting in opposition to the rotational drive of said outer chuck housing against the outer cam surfaces of said gripper segments.

7. A capping chuck assembly, comprising:

a plurality of circumferentially spaced, radially movable gripper segments, each said gripper segment having an inner jaw portion for engagement with an associated closure, and an outer cam surface; and an outer chuck housing within which said plurality of gripper segments are positioned, said chuck housing having an inwardly facing surface defining a plurality of circumferentially spaced cam drive surfaces positioned for respective engagement with the outer cam surfaces of said gripper segments, so that attendant to rotational drive of said outer chuck housing, said cam drive surfaces collectively drive the outer cam surfaces of said gripper segments to drive said gripper segments together with said outer chuck housing, and to radially drive said segments into engagement with the associated closure, including a biasing element which extends circumferentially about said gripper segments for urging said gripper segments inwardly.

8. A capping chuck assembly in accordance with claim 7, including a central guide disc on which said gripper segments are mounted for radial movement.

9. A capping chuck assembly in accordance with claim 8, including a torsion spring operatively connecting said central guide disc and said outer chuck housing, said torsion spring acting in opposition to the rotational drive of said outer chuck housing against the outer cam surfaces of said gripper segments.

10. A capping chuck assembly, comprising:

a central guide disc;

a plurality of circumferentially spaced gripper segments mounted on said central guide disc for rotation therewith, said gripper segments being individually movable generally radially of said central guide disc, and each having an inner jaw portion for engagement with an associated closure, and an outer cam surface; and an outer chuck housing within which said central guide disc and said plurality of gripper segments are positioned, said chuck housing having an inwardly facing surface defining a plurality of circumferentially spaced cam drive surfaces positioned for respective engagement with the outer cam surfaces of said gripper segments, so that attendant to rotational drive of said outer chuck housing, said cam drive surfaces collectively drive the outer cam surfaces of said gripper segments to drive said central guide disc and said gripper segments together with said outer chuck housing and to urge said segments into engagement with the associated closure, wherein said central guide disc comprises a guide disc base defining a plurality of guide channels within which said plurality of gripper segments are respectively positioned for movement radially of said central guide disc, and guide disc cover secured to said guide disc base so that said gripper segments are held between said guide disc cover and said guide disc base.

11. A capping chuck assembly, comprising:

a plurality of circumferentially spaced, radially movable gripper segments, each said gripper segment having an inner jaw portion for engagement with an associated closure, and an outer cam surface; and an outer chuck housing within which said plurality of gripper segments are positioned, said chuck housing having an inwardly facing surface defining a plurality of circumferentially spaced cam drive surfaces positioned for respective engagement with the outer cam surfaces of said gripper segments, so that attendant to rotational drive of said outer chuck housing, said cam drive surfaces collectively drive the outer cam surfaces of said gripper segments to drive said gripper segments together with said outer chuck housing, and to radially drive said segments into engagement with the associated closure, wherein said jaw portion of each said gripper segment has one or more gripping teeth, the jaw portion of each gripper segment having one or more regions which are devoid of gripping teeth, said gripping teeth of each one of said gripper segments being generally aligned with a force vector that is created through that one of the gripper segments by the respective one of the cam drive surfaces of said chuck housing acting against the cam surface of that one of the gripper segments.

12. A capping chuck assembly in accordance with claim 11, wherein the jaw portion of each of said gripper segments includes a single gripping tooth.

13. A capping chuck assembly in accordance with claim 11, including a biasing element which extends circumferentially about said gripper segments for urging said gripper segments inwardly.

* * * * *